April 6, 1937.  H. A. DOUGLAS  2,076,074
LIGHTING SYSTEM FOR AUTOMOTIVE VEHICLES
Filed March 15, 1935
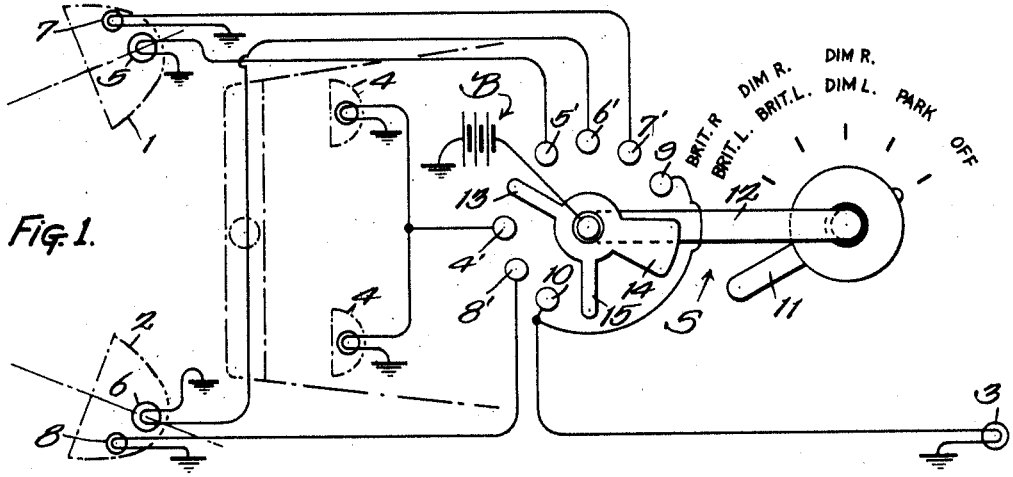
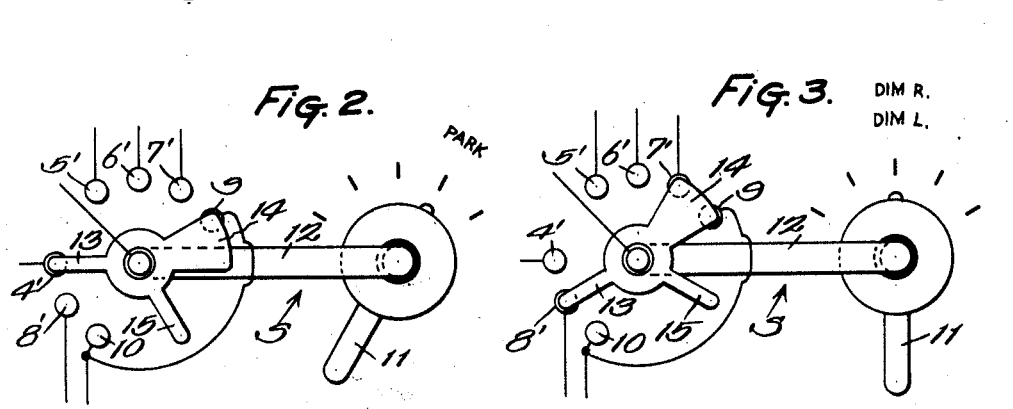
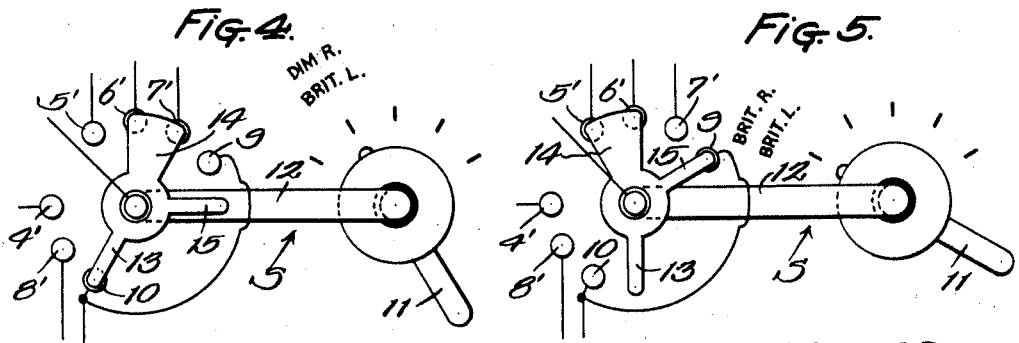
INVENTOR:
HARRY A. DOUGLAS
BY Langdon Moore
ATTY.

Patented Apr. 6, 1937

2,076,074

UNITED STATES PATENT OFFICE 2,076,074

LIGHTING SYSTEM FOR AUTOMOTIVE VEHICLES

Harry A. Douglas, Bronson, Mich.

Application March 15, 1935, Serial No. 11,285

10 Claims. (Cl. 171—97)

This invention relates to improvements in lighting systems for automotive vehicles, and more particularly to such a system which includes the provision of headlamps upon the front of the vehicle arranged to project the illuminating beams of light emanating therefrom at an angle to the forward direction of travel of the vehicle to cross each other in front of the vehicle with means for controlling the intensity of the projected beams to meet various driving conditions.

It is an object of this invention to provide a lighting system which will at all times provide sufficient illumination of the road ahead for the safe operation of an automotive vehicle at customary driving speeds and yet be able to reduce or remove the glare of the lights upon the eyes of an individual approaching from the opposite direction, without detriment to the illumination of the near side of the road ahead.

The advantages of such a system are obvious. The provision of headlamps projecting the light beams from the respective lamps to cross each other in front of the vehicle provides maximum illumination with the left headlamp at all times illuminating the near, right, or ditch side of the road which must be visible at all times to the operator of the vehicle for safe driving. In such a system, the right headlamp normally illuminates the far, or left side of the road, so that reducing the intensity of the right headlamp beam reduces, or removes, the glare normally projected toward the eyes of a person approaching from the opposite direction without detriment to the normal illumination of the near, or ditch, side of the road.

The invention will be more fully explained by reference to the accompanying drawing in which:

Figure 1 is a view in diagram illustrating a preferred embodiment of the invention, including a wiring diagram showing the light switch in the "off" position.

Figure 2 is a detail fragmentary view of Figure 1 showing the light switch in position to establish the "parking" and "tail" lamps in circuit.

Figure 3 is a similar view showing the light switch in position to establish the "dim" lamps of both right and left headlamps and the "tail" lamp in circuit.

Figure 4 is a similar view showing the light switch in position to establish the "dim" lamp of the right headlamp together with the "bright" lamp of the left headlamp and "tail" lamp in circuit.

Figure 5 is a similar view showing the position of the light switch to establish the "bright" lamps of both right and left headlamp and "tail" lamp in circuit.

For many years headlamps for automotive vehicles have been marketed which project by various means an intensive or "bright" beam, for road driving, with a less intensive or "dim" beam, used when meeting other vehicles, or for city driving. At the time this invention was conceived, it was customary to accomplish this result by providing a lamp filament at approximately the focal center of the headlamp reflector to project a high, strong beam of light in the direction of travel and another lamp filament thereabove to project a beam tilted downward to intercept the road at a point nearer the vehicle to remove the full strength or glare from the eyes of individuals approaching from the opposite direction. This was accomplished either by mounting the respective filaments in two separate lamp bulbs, one above the other, in each headlamp, or by employing in each headlamp a two filament lamp bulb having one filament above the other.

It was also common practice at the time this invention was conceived to provide headlamps with lenses having definite optical properties controlling light beam distribution, to provide headlamps with reflectors having configuration controlling light beam distribution, or to provide headlamps having a combination of the two mentioned means for controlling the light beam distribution, so that, the carrying out of this invention, which contemplates the projection of headlamp beams in the path of travel and transversely of the vehicle, may be accomplished either by the manner in which the reflectors are positioned in the respective headlamps, or the manner in which the respective headlamps are mounted upon the vehicle. The particular means by which the two beams are caused to emanate from the headlamps of the vehicle forms no part of this invention, as it contemplates the employment of conventional or commercial headlamps which are so adjusted upon the vehicle that the high beams from the "bright" lamp filaments cross each other over the road in advance in the direction of travel which may be changed to the "dim," low or tilted beams from the other lamp filaments by a single light switch controlling the circuits to the respective lamp filaments.

In a like manner, it is immaterial to this invention whether the "parking" lamps are arranged on opposite sides of the vehicle, or are included as additional lamp bulbs mounted in the headlamps. In the latter case, "parking" lamp bulbs are mounted in the top of the reflector to tilt its beams upon the road immediately in front of the vehicle. In both cases, the "parking" lamp bulbs customarily produce beams of less intensity than the "bright" lamp filaments.

In view of the above explanation, it is to be understood that in describing the embodiment of this invention illustrated upon the drawing, the "bright" light of the headlamp includes either an individual bulb with a single filament positioned in relation to the reflector to direct its beam in the direction of the focal axis of the headlamp reflector, or one filament of a two filament lamp bulb to accomplish this result and the term "dim" light of the headlamp includes either an additional lamp bulb mounted in the headlamp reflector vertically above the "bright" light to tilt its beams downward to intercept the road ahead adjacent the front of the vehicle or the upper filament of a two filament lamp bulb in which the lower filament produces the "bright" light. Likewise, it is to be understood that the filament of the "dim" lamp bulb customarily produces a beam of less intensity than the "bright" light or filament. Also, the term "dimming" the headlamp includes the opening of the circuit through the "bright" filament and closing the circuit through the "dim" filament to tilt the beam upon the road to reduce the glare from the headlamp and is synonymous with the expression "tilting" the headlamp as applied to the two filament headlamp. The provision of headlamps arranged to project their light beams in the direction of travel to cross each other in advance of the vehicle may include headlamps provided with lenses to bend the beam passing therethrough to accomplish this result; headlamps wherein the reflectors are so mounted within the headlamp to accomplish this result; headlamp permanently mounted upon the vehicle at an angle to accomplish this result; or, a combination of the above methods to produce the above mentioned results.

The embodiment of this invention, as shown in the diagrammatic view of Figure 1, discloses the simplest form of this invention which includes commercial headlamps 1 and 2 mounted upon the front of the vehicle and arranged permanently to project the beams emanating therefrom in the direction of travel and to cross each other in advance of the vehicle, a tail lamp 3 and side lamps 4 which are mounted upon opposite sides of the vehicle at the rear of the headlamps 1 and 2. In the form illustrated, the "bright" lights of the headlamps are single filament lamp bulbs 5 and 6, and the "dim" lights are additional single filament lamp bulbs 7 and 8, mounted vertically above the lamp bulbs 5 and 6, respectively, and nearer the top of the reflector. As customary, one terminal of each of said lamp bulbs in the head, tail and parking lamps is grounded and the other terminal connected by an electrical conductor to a light switch S.

The light switch S includes a series of contacts arranged in a circle in which contact 5' is connected by an electric conductor to "bright" lamp bulb 5 of the right headlamp 1; contact 6' is connected by an electric conductor to the "bright" lamp bulb 6 of the left headlamp 2; contact 7' is connected by an electric conductor to the "dim" lamp bulb 7 of the right headlamp 1; contact 9 is connected by an electric conductor to contact 10 which in turn is connected by an electric conductor to the lamp bulb of the tail lamp 3; contact 8' is connected by an electric conductor to the "dim" lamp bulb 8 of the left headlamp 2; and contact 4' is connected to both lamp bulbs of the parking lamps 4. The light switch includes a switch handle 11 mounted upon a switch operating shaft 12 adapted to rotate upon the center of the circular row of contacts.

The operating shaft 12 is connected to rotate a metallic circuit continuing plate having radiating fingers 13, 14 and 15 which suitably are spaced apart and adapted to engage the said contacts, as hereinafter described. The circuit continuing plate is connected by an electric conductor to the grounded battery B.

The light switch S is preferably mounted upon the instrument board of the automotive vehicle and is provided with markings visible to the operator indicating the lamp bulbs connected in circuit in accordance with the position of the switch handle 11. When the handle 11 is in the position shown in Figure 1, all of the lamp bulbs are out of circuit. When the handle has been moved to the position shown in Figure 2, the parking and tail lamp bulbs are alone in circuit, as finger 13 continues to circuit through contact 4' and finger 14 continues the circuit through contacts 9 and 10. When the handle has been moved to the postion shown in Figure 3, the "dim" lamp bulbs 7 and 8 of headlamps 1 and 2 are both in circuit together with the lamp bulb of the tail lamp 3, as finger 13 continues the circuit to contact 8' and finger 14 continues the circuit through contacts 7', 9 and 10. In Figure 4, the handle has been moved so that the finger 13 continues the circuit to the contact 10 to the tail lamp bulb and the finger 14 continues the circuit through both contacts 6' and 7' whereby the "bright" lamp 6 of the left headlamp is energized to illuminate the near or ditch side of the road and the "dim" lamp 7 of the right headlamp is energized which tilts the beam of that headlight upon the road and out of the eyes of the individual approaching from the opposite direction. When the handle has been moved to the last position, as shown in Figure 5, the finger 15 continues the circuit to contact 9 and through contact 10 to the tail lamp bulb and through finger 14 through both contact 5' and 6' whereby the "bright" lamp bulbs 5 and 6 in the headlamps 1 and 2 are both energized and the headlamps afford the maximum illumination of the road ahead.

What I claim is:

1. A cross beam electric lighting system for automobile vehicles including two headlamps permanently directing light beams in the direction of travel to cross each other in advance of the vehicle, each head lamp provided with a source of light for projecting a high beam and a source of light for projecting a tilted beam therefrom, a source of electricity, and single means for selectively and successively and instantaneously establishing circuits from the source of electricity to the respective sources of light in the respective headlamps.

2. A cross beam electric lighting system for automotive vehicles including two headlamps permanently directing light beams in the direction of travel to cross each other in advance of the vehicle, each headlamp provided with a source of light for projecting a high beam and a source of light for projecting a tilted beam therefrom, a source of electricity, and single rotative means to instantaneously establish circuits from said source to the source of the high beams in the two headlamps, from said source to the tilted beams in the two headlamps, and from the said source of electricity to the source of the high beam in one headlamp and to the source of the tilted beam in the other headlamp to cause the high beam to cast its illumination transversely of the vehicle upon the side of the road most distant to its source and simultaneously cause the tilted beam to illuminate the road more adjacent the vehicle and the side of the road most adjacent to the source of the high beam.

3. An automotive vehicle having two headlamps provided with electric lamps having filaments to project a high beam and filaments to project a tilted beam to intercept the road more adjacent the vehicle, said headlamps permanently directing their light beams in the direction of travel to cross each other in advance of the vehicle, a source of electricity, and a single means for selectively and successively and instantaneously establishing a circuit from the source to the high beam filaments, another circuit to one high beam filament in one headlamp and one tilted beam filament in the other headlamp, and a third circuit to the tilted beam filaments.

4. An automotive vehicle having two headlamps provided with electric lamps having bright and dim filaments permanently projecting their light beams from each headlamp in the direction of travel to cross each other in advance of the vehicle, a source of electricity, a single switch movable in either of two directions connected to said source, and means upon operation of the switch in one direction from the off position to establish a circuit to the dim filaments of both headlamps in one position, to establish a circuit to the bright filaments in each headlamp when moved in the same direction to another position, and to instantaneously establish a circuit to the dim filament in the right headlamp and the bright filament in the left headlamp when moved in the reverse direction to another position to tilt the glare of the light beam projected toward the eyes of a person approaching from the opposite direction upon the road more adjacent the vehicle without lessening the maximum illumination of the near, right, ditch side of the road.

5. The structure of claim 4 wherein the vehicle is provided with parking and tail lamps and wherein said switch is provided with means upon operation into an additional position to establish a circuit to said parking and tail lamps independent of the headlamps and wherein in each of the first three positions to establish a circuit to the tail lamp in conjunction with said headlamps.

6. In a lighting system for an automotive vehicle, the combination of a source of electricity with a pair of headlamps permanently mounted to project their respective light beams in the direction of travel to cross each other in advance of the vehicle, each headlamp provided with electric lamps having bright filaments to project a high beam and dim filaments to project a tilted beam to intercept the road more adjacent the vehicle, and a unitary switching mechanism for selectively and instantaneously establishing uninterrupted circuits through both dim filaments, through both bright filaments, or through the bright filament of the left headlamp and the dim filament of the right headlamp, respectively.

7. In a lighting system for an automotive vehicle, the combination of a source of electricity with a pair of headlamps permanently mounted to project their respective light beams in the direction of travel to cross each other in advance of the vehicle, each headlamp provided with electric lamps having bright filaments to project a high beam and dim filaments to project a tilted beam to intercept the road more adjacent to the vehicle, a unitary switching mechanism provided with a rotatably mounted current continuing plate and an operating handle therefor, a conductor leading from the current continuing plate to the source of electricity, uninterrupted conductors leading from each filament of the respective electric lamps terminating in spaced-apart contacts adapted to be engaged by the current continuing plate of the switching mechanism, the contact of the conductor leading from the bright filament of the left headlamp being interposed between the contacts of the conductors leading from the right headlamp, and means forming a part of the current continuing plate adapted to selectively and instantaneously engage the pairs of contacts to both dim filaments, the pairs of contacts to both bright filaments, or the contacts of the dim filament of the right headlamp and the bright filament of the left headlamp respectively.

8. In a lighting system for an automotive vehicle, the combination of a source of electricity with a pair of headlamps permanently mounted to project their respective light beams in the direction of travel to cross each other in advance of the vehicle, each headlamp provided with electric lamps having a bright filament to project a high beam and a dim filament to project a tilted beam to intercept the road more adjacent to the vehicle, a unitary switching mechanism provided with a rotatably mounted current continuing plate including means for operating the same, a conductor leading from the current continuing plate to the source of electricity, uninterrupted conductors leading from each filament of the respective electric headlamps and terminating in spaced-apart contacts adapted to be instantaneously engaged by the current continuing plate of the switching mechanism, the contact of the conductor leading from the bright filament of the left headlamp being interposed between the contacts of the conductors leading from the right headlamp, and the current continuing plate being provided with fingers adapted in one position to engage the dim filament contacts of both headlamps, in the next successive position to move one finger out of engagement with the dim filament contact of the left headlamp and the other finger maintaining engagement with the dim filament contact of the right headlamp and being also moved into engagement with the bright filament contact of the left headlamp, and in the next successive position to move said last mentioned finger out of engagement with said dim filament contact for the right headlamp into engagement with the contacts for the bright filaments of both headlamps.

9. In a lighting system for an automotive vehicle, the combination of a source of electricity with a pair of headlamps permanently mounted to project their respective light beams to cross each other in advance of the vehicle, each headlamp provided with electric lamps having bright filaments to project a high beam and dim filaments to project a tilted beam, and a unitary switching mechanism arranged in combination and electrically connected to the filaments whereby the filaments of the right headlamp may be dimmed while the bright filament of the left headlamp remains bright.

10. In a lighting system for an automotive vehicle, the combination of a source of electricity with a pair of headlamps permanently mounted to project their respective light beams to cross each other in advance of the vehicle, each headlamp provided with an electrical illuminating means, and a single unitary switching mechanism arranged in combination and electrically connected to each of said illuminating means whereby the illuminating means in the right headlamp may be instantaneously dimmed while the illuminating means of the left headlamp remains bright.

HARRY A. DOUGLAS.